Figure 1:
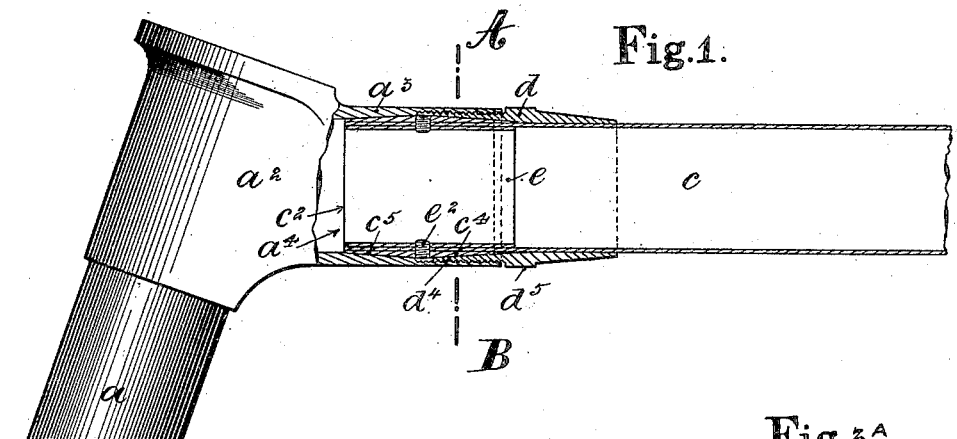

No. 622,537. Patented Apr. 4, 1899.
H. S. RAINFORTH.
BRAZELESS JOINT FOR CYCLE FRAMES.
(Application filed Nov. 8, 1897.)

(No Model.)

Fig. 3.    Fig. 3ᴬ.

Witnesses

Inventor
Henry Slack Rainforth

UNITED STATES PATENT OFFICE.

HENRY SLACK RAINFORTH, OF LINCOLN, ENGLAND.

BRAZELESS JOINT FOR CYCLE-FRAMES.

SPECIFICATION forming part of Letters Patent No. 622,537, dated April 4, 1899.

Application filed November 8, 1897. Serial No. 657,843. (No model.)

*To all whom it may concern:*

Be it known that I, HENRY SLACK RAINFORTH, engineer, a subject of the Queen of Great Britain, residing at "The Uplands," Lincoln, in the county of Lincoln, England, have invented a certain new and useful Brazeless Joint for Cycle-Framings, of which the following is a specification.

This invention consists in an improved construction of brazeless joint for connecting together the component members of a cycle's framing, the chief characteristics of which are neatness, simplicity, security, and absolute rigidity.

The invention is designed to supersede the brazed joint now generally used, which is expensive on account of its requiring to be trimmed or finished, weak on account of the softening of the parts amalgamated, and imperfect in consequence of the metal being burned or overfused.

According to this invention the brazeless joint, which is a permanent one, is distinguished by a differentially-coned collar part rigid upon or with the tubular member, a coned seating upon the other or socket member, which has a screwed mouth, and a jamming or clamping screw nut or ring adapted to screw into the mouth of the socket and to surround the tubular member and having a coned seating within its bore to pull up against the coned collars, as aforesaid.

In the accompanying sheet of drawings the invention is practically set forth, reference-letters being used thereon to distinguish the parts, which will be hereinafter fully described.

The invention is shown in the drawings applied to connect the end of the top front frame-bar to the crown-lug of the socket-head.

Figure 2:
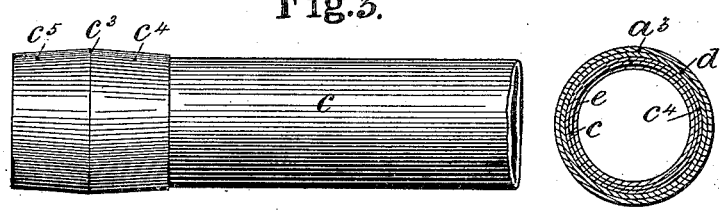
Figure 2:
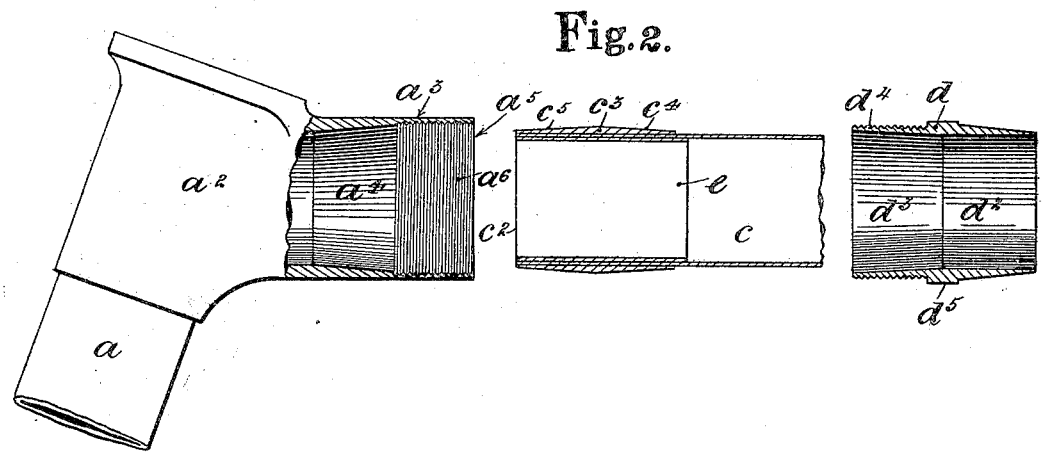

Figure 1 illustrates the parts connected, and Figs. 2 and 3 the parts before being connected, the horizontal extension of the socketed head being broken in section for the purpose. Fig. 3$^A$ is a transverse section of Fig. 1 upon the dotted line A B.

The horizontal extension of the crown-lug $a^2$ of the socket-head $a$, which is to form a socket for the end of the tubular framing member, is bored out a little larger than the diameter of the said tubular member, and at the extreme inner part thereof is formed an annular coned seating $a^4$, the smallest diameter of which is innermost of the socket's mouth. The bore of the socket for a distance inward of its mouth $a^5$ is screwed at $a^6$, the diameter of the said screwed part being a little larger than the largest diameter of the coned seating $a^4$.

The end $c^2$ of the tubular frame member $c$, which is to fit within the socket extension $a^3$ and to be there permanently and rigidly affixed, is enlarged or constructed with a collar $c^3$ upon it, shaped into differential or reversed annular coned parts $c^4$ $c^5$, the latter coned part, which is at the extreme end of the tubular member, being coned in a direction to fit the coned seating $a^4$, before described, within the bottom of the bore of the socket extension $a^3$ of the lug $a^2$, and the former coned part, which is outward of the latter one, being in an opposite direction thereto, the two coned parts being either divided by a reduced diameter or running into each other. Within the bore of the end $c^2$ of the tubular member $c$, so as to tightly fit it and to extend the length of the collar $c^3$, is inserted a tubular piece or liner $e$ for the purpose of strengthening internally the said tubular member at the point where the collar $c^3$ embraces it. The liner $e$ is necessary in consequence of the collar $c^3$, which is made separate from the tube, being forced upon the end $c^2$ of the tubular member $c$, which for the most part affixes it.

As a further security against the collar coming loose, cross pins or pegs $e^2$ are passed through it and the metal of the tube. The said collar may be sweated upon the tube, if necessary, or otherwise affixed; but in every case it is absolutely and permanently rigid with the said tube.

A clamping or jamming-screw nut or ring $d$, which is the pulling-up component in the joint, is threaded upon the tubular member $c$ prior to the coned end $c^3$ being forced on. This clamping nut or ring is bored outwardly at $d^2$ to fit nicely the tube $c$ and inwardly at $d^3$ to the counterpart of the coned part $c^4$ of the collar $c^3$, and its exterior $d^4$ is screwed to fit the screwed mouth $a^6$ of the socket extension $a^3$. There is also a slight angular collar $d^5$ on the circumference of this clamping nut or ring for the purpose of laying hold of it with a spanner or wrench for pulling together the parts; but after the said parts have been once connected these annular parts are removed, as the joint is a permanent one.

In making the joint the differentially-coned collar $c^3$ of the tube $c$ is first placed in the socket extension $a^3$, so that the coned part $c^5$ seats itself within the coned seating $a^4$ within the lug extension. The clamping-ring $d$ is now drawn over the differentially-coned end $c^3$ and its screwed part $c^4$ made to engage the screwed mouth $a^6$ of the lug extension $a^3$. This screwing up of the clamping-ring causes its coned bore $d^3$ to after a time impinge against the coned part $c^4$ of the collar $c^3$ and on further screwing to force the coned collar onto the coned seating $a^4$ and jam it between that part and the bore $d^3$ of the clamping-ring. When the clamping-nut has been forced home to its full extent, the angles are removed from the part $d^5$ by suitable means and the joint will not become again loosened.

A cross-peg passed through the parts may, if necessary, form an extra means of security.

The parallel part of the clamping ring or nut $d$ fits stiffly the tube $c$ and forms an extended bearing upon the same; but it will be observed that the primary gripping parts of the joint are, theoretically, and the coned faces $c^4$ and $c^5$ of the collar $c^3$ and their seating as the center of the coned collar or the meeting edges of the coned parts are not, gripped.

Having now described my invention, what I claim, and desire to secure by Letters Patent, is—

In a permanent brazeless joint for tubular structures, the combination with a tubular member having a smooth tapered bore $a^4$, and an internally-threaded cylindrical portion $a^6$, adjacent to said tapered bore, of a second tubular member $c$, adapted to be permanently secured to said first-named tubular member, a differentially-tapered collar $c^3$, attached to one end of the member $c$, and providing two oppositely-tapered enlargements $c^4$, $c^5$, the inclined walls of which meet at the center of the collar, the tapered part $c^5$, of said collar fitting into the smooth tapered bore $a^4$, a jam-nut $d$, having an external-threaded portion $d^4$, at one end adapted to be screwed into the threaded cylindrical portion $a^6$, said nut being also provided with a tapered bore $d^3$, diametrically opposite its threaded portion which extends from the center thereof to one end, to fit over the tapered enlargement $c^4$, of the said tapered collar when the parts are in position, and an integral sleeve $d^2$ at the opposite end of the nut to fit over the tubular member $c$, the parts being combined and arranged to provide a permanent joint.

In testimony whereof I have signed this specification in the presence of two subscribing witnesses.

HENRY SLACK RAINFORTH.

Witnesses:
JOHN SWAN,
J. R. RATHBY.